W. CLEVELAND.
Refrigerators.
No. 155,068. Patented Sept. 15, 1874.
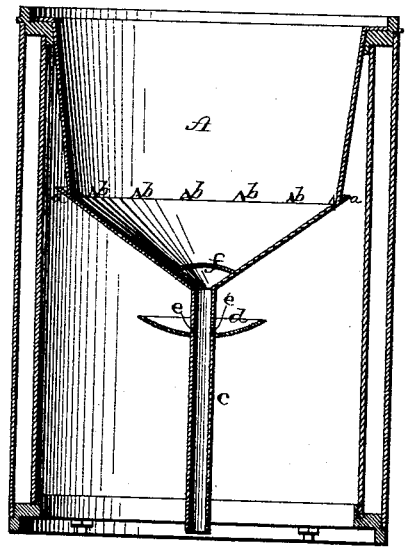

UNITED STATES PATENT OFFICE.

WILLIAM CLEVELAND, OF ORANGE, NEW JERSEY.

IMPROVEMENT IN REFRIGERATORS.

Specification forming part of Letters Patent No. 155,068, dated September 15, 1874; application filed February 23, 1874.

*To all whom it may concern:*

Be it known that I, WILLIAM CLEVELAND, of the city of Orange, in the county of Essex and State of New Jersey, have invented certain new and useful Improvements in Refrigerators; and I do hereby declare the following to be a full, clear, and exact description of the invention, such as will enable others skilled in the art to which it pertains to make and use it, reference being had to the accompanying drawings, which form part of this specification.

The object of this invention is to catch the water which gathers upon the outside of the ice-chamber of a refrigerator, consequent upon condensation, and carry it off through the waste-pipe.

The accompanying drawing illustrates my invention, which consists in having the bottom of the ice-chamber A to project beyond the outside of said chamber, so as to form a receptacle, $a$, for the water which collects thereon, and which passes through apertures $b$ in the side of the chamber, and is carried off through the waste-pipe $c$. There is also a suitable cup, $d$, soldered to the waste-pipe just below the bottom of the ice-chamber, to catch the water dripping therefrom, and the waste-pipe is perforated, as at $e$, so that the water passes off through it. The bottom of the ice-chamber is provided with a suitable screen, $f$, to prevent the sediment from entering into and clogging the waste-pipe.

What I claim as new, and desire to secure by Letters Patent, is—

In a refrigerator, the ice-chamber A, having the flange $a$ and apertures $b$, sieve $f$, pipe $c$, cup $d$, and apertures $e$, substantially as shown and described.

In testimony that I claim the foregoing I have hereunto set my hand this 20th day of February, 1874.

WM. CLEVELAND.

Witnesses:
OLIVER DRAKE,
GEO. H. WILSON.